United States Patent
McDaniel

(10) Patent No.: US 9,030,462 B2
(45) Date of Patent: May 12, 2015

(54) SKETCHING THREE-DIMENSIONAL(3D) PHYSICAL SIMULATIONS

(75) Inventor: Richard Gary McDaniel, Hightstown, NJ (US)

(73) Assignee: Siemens Corporation, Iselin, NJ (US)

( * ) Notice: Subject to any disclaimer, the term of this patent is extended or adjusted under 35 U.S.C. 154(b) by 1263 days.

(21) Appl. No.: 12/236,584

(22) Filed: Sep. 24, 2008

(65) Prior Publication Data

US 2009/0079734 A1    Mar. 26, 2009

Related U.S. Application Data

(60) Provisional application No. 60/974,573, filed on Sep. 24, 2007.

(51) Int. Cl.
| | | |
|---|---|---|
| *G06T 13/20* | (2011.01) | |
| *G06T 19/00* | (2011.01) | |
| *G06F 3/0488* | (2013.01) | |

(52) U.S. Cl.
CPC ............. *G06T 19/00* (2013.01); *G06F 3/04883* (2013.01); *G06T 2200/24* (2013.01); *G06T 13/20* (2013.01)

(58) Field of Classification Search
None
See application file for complete search history.

(56) References Cited

U.S. PATENT DOCUMENTS

| | | | |
|---|---|---|---|
| 4,058,849 A | 11/1977 | Fitzgerald et al. | |
| 5,012,521 A | 4/1991 | Endo et al. | |
| 5,068,804 A | 11/1991 | Watanabe et al. | |
| 5,467,411 A | 11/1995 | Tanaka et al. | |
| 5,771,342 A | 6/1998 | Todd | |
| 5,805,168 A | 9/1998 | Minakata | |
| 5,877,777 A * | 3/1999 | Colwell | 345/473 |
| 5,990,900 A | 11/1999 | Seago | |
| 6,054,990 A | 4/2000 | Tran | |
| 6,067,094 A | 5/2000 | Schuster | |
| 6,195,625 B1 * | 2/2001 | Day et al. | 703/7 |
| 6,233,351 B1 | 5/2001 | Feeney et al. | |
| 6,289,513 B1 | 9/2001 | Bentwich | |
| 6,292,190 B1 | 9/2001 | Corn | |
| 6,308,144 B1 | 10/2001 | Bronfeld et al. | |
| 6,549,201 B1 | 4/2003 | Igarashi et al. | |
| 6,618,040 B1 | 9/2003 | Mattaway et al. | |
| 6,628,279 B1 * | 9/2003 | Schell et al. | 345/420 |
| 6,628,287 B1 | 9/2003 | Duda et al. | |
| 6,791,549 B2 * | 9/2004 | Hubrecht et al. | 345/473 |
| 7,058,896 B2 | 6/2006 | Hughes | |

(Continued)

FOREIGN PATENT DOCUMENTS

WO    00/31689 A    6/2000

OTHER PUBLICATIONS

Masry M, Lipson H. A sketch-based interface for iterative design and analysis of 3d objects. In: Proceedings of the eurographics workshop on sketch-based interfaces and modeling (SBIM '05), 2005.*

(Continued)

*Primary Examiner* — Daniel Hajnik

(57) ABSTRACT

A system for creating physical simulations using hand-sketched three-dimensional (3D) objects, including: a memory device for storing a program; a processor in communication with the memory device, the processor operative with the program to enable: 3D objects to be hand-sketched and assigned physical descriptions; and behavior of the physical descriptions to be simulated in a physics environment.

17 Claims, 2 Drawing Sheets

(56) References Cited

U.S. PATENT DOCUMENTS

| | | | |
|---|---|---|---|
| 7,149,665 | B2 | 12/2006 | Feld et al. |
| 7,639,250 | B2* | 12/2009 | Xu et al. ............... 345/419 |
| 2003/0025713 | A1 | 2/2003 | Wang et al. |
| 2004/0037463 | A1 | 2/2004 | Calhoun et al. |
| 2004/0090439 | A1 | 5/2004 | Dillner |
| 2004/0193428 | A1 | 9/2004 | Fruchter et al. |
| 2004/0227752 | A1* | 11/2004 | McCartha et al. ....... 345/419 |
| 2006/0001664 | A1 | 1/2006 | Carbonera |
| 2006/0045337 | A1 | 3/2006 | Shilman et al. |
| 2006/0045343 | A1 | 3/2006 | Tremblay et al. |
| 2006/0082571 | A1 | 4/2006 | McDaniel |
| 2006/0114252 | A1 | 6/2006 | Ramani et al. |
| 2008/0010041 | A1 | 1/2008 | McDaniel |
| 2008/0036773 | A1* | 2/2008 | Bae ..................... 345/442 |

OTHER PUBLICATIONS

Christine Alvarado and Randall Davis. 2006. Resolving ambiguities to create a natural computer-based sketching environment. In ACM SIGGRAPH 2006 Courses (SIGGRAPH '06). ACM, New York, NY, USA, , Article 24.*

Decaudin, P., Julius, D., Wither, J., Boissieux, L., Sheffer, A. and Cani, M.-P. (2006), Virtual Garments: A Fully Geometric Approach for Clothing Design. Computer Graphics Forum, 25: 625-634.*

Joao P. Pereira, Joaquim A. Jorge, Vasco A. Branco, F. Nunes Ferreira; Calligraphic Interfaces: Mixed Metaphors for Design. Interactive Systems. Design, Specification, and Verification ; Lecture Notes in Computer Science vol. 2844, 2003, pp. 154-170.*

Igarashi, Takeo, and John F. Hughes. "Clothing manipulation." In Proceedings of the 15th annual ACM symposium on User interface software and technology, pp. 91-100. ACM, 2002.*

Zheng et al., A 3D Sketching Interacting Tool for Physical Simulation Based on Web, Human-Computer Interaction. Interaction Platforms and Techniques, Lecture Notes in Computer Science vol. 4551, Jul. 2007, pp. 710-719.*

Durupinar, Funda, et al. "A 3D garment design and simulation system." Thesis, Institute of Engineering and Science of Bilkent University (2004).*

Pereira, João Paulo, et al. "Towards Calligraphic Interfaces: Sketching 3D Scenes with Gestures and Context Icons." WSCG. 2000.*

Igarashi et al., "Teddy: A Sketching Interface for 3D Freeform Design", ACM SIGGRAPH, 1999, http://www-ui.is.s.u-tokyo.ac.jp/~takeo/teddy/teddy.htm.

Masry et al., Freehand Sketching Interface for Progressive Construction and Analysis of 3D Objects, American Association for Artificial Intelligence, 2004, http://ccsl.mae.cornell.edu/papers/AAAI04_Masry.pdf.

Smith, Open Dynamics Engine v0.5 User Guide, PDF Document copyright 2001-2004, Feb. 2006.

Eggli, L. et al.: "Inferring 3D Models From Freehand Sketches and Constraints", Computer Aided Design, Elsevier Publishers BV., Barking, GB, vol. 29, No. 2, Feb. 1997, pp. 101-112.

Grimstead, I. J. et al.: "Creating Solid Models From Single 2D Sketches", Proceedings. Third Symposium on Solid Modeling and Application ACM New York, NY USA, 1995, pp. 323-337.

Lipson, H. et al.: "Optimization-Based Reconstruction of a 3D Object From a Single Freehand Line Drawing", Computer Aided Design, Elsevier Publishers, BV., Barking, GB, vol. 28, No. 8, Aug. 1996, pp. 651-663.

Igarashi, T. et al.: Teddy: a Sketching Interface for 3D Freeform Design, Computer Graphics Proceedings, Siggraph 99, ACM New York, NY, USA, 1999, pp. 409-416.

Jenkins, D. L. et al.: "Applying Constraints to Enforce Users' Intentions in Free-Hand w-D Sketches", Intelligent System Engineering, Institution of Electrical Engineers, Stevenage, GB, vol. 1, No. 1, Sep. 21, 1992, pp. 31-49.

Lipson, H. et al.: "Conceptual Design and Analysis by Sketching", (AI EDAM) Artificial Intelligence for Engineering Design, Analysis and Manufacturing Cambridge University Press UK, vol. 14, No. 5, Nov. 2000, pp. 391-401.

Zeleznik, Robert C. et al., "SKETCH: An Interface for Sketching 3D Scenes", Research Director Computer Graphics, Brown University. [Retrieved Mar. 25, 2005] Retrieved from Internet: URL: < http://www.cs.brown.edu/people/bcz/sketch/sig.html > 23pgs.

"3D Studio Max", Discreet. [Retrieved Mar. 24, 2005] Retrieved from Internet: URL: http://www4.discreet.com/3dsmax/ > 2pgs.

"Create Without Compromise", Pro/Engineer Wildfire, Parametric Technology Corporation. [Retrieved Mar. 24, 2005] Retrieved from Internet: URL: < http://www.ptc.com/cgi/common/print_version.pl > 2pgs.

"Adobe Photoshop: Professional Photo editing software", Adobe Systems Inc. [Retrieved Mar. 24, 2005] Retrieved from Internet: URL: < http://www.adobe.com/products/photoshop/main.html > 2pgs.

"LU Decomposton and Its Applcatons", Numerical Recipes in C: The Art of Scientific Computing, ISBN 0-521-43108-5, Cambridge University Press, 1988-1992. pp. 43-50.

L. Eggli, B.D. Bruderlin, and Gershon Elber, "Sketching as a Solid Modeling Tool", Solid Modeling '95, Salt Lake City, Utah, 1995. pp. 313-321.

Havinga Software, ThreeDimSim Mechanics Simulator (http://www.havingasoftware.nl/software/ThreeDimSim.htm, printed Oct. 11, 2006).

Mathworks, Simulink—Simulation and Model-Based Design (http://www.mathworks.com/products/simulink, printed Oct. 11, 2006).

UGS, NX Motion Simulation-RecurDyn product brochure (http://www.ugs.com/products/nx/docs/fs_nx_motion_simulation_recurdyn.pdf, printed Oct. 11, 2006).

* cited by examiner

SKETCHING THREE-DIMENSIONAL(3D) PHYSICAL SIMULATIONS

CROSS-REFERENCE TO RELATED APPLICATION

This application claims the benefit of U.S. Provisional Application No. 60/974,573, filed Sep. 24, 2007, the disclosure of which is incorporated by reference herein in its entirety.

BACKGROUND OF THE INVENTION

1. Technical Field

The present invention relates to systems and methods for physical simulation, and more particularly, to a system and method for physically simulating hand-sketched three-dimensional (3D) objects.

2. Discussion of the Related Art

Designing new objects such as machines, clothing, and other goods is typically performed by a designer using paper and pencil. Though paper is cheap and easy to use, it is not possible to draw something thereon that can literally be viewed from any direction and that can move and interact with other objects.

With a computer, it is possible to render 3D shapes and to calculate the laws of physics so that 3D objects can move and interact; however, current methods used to create these environments, such as computer-aided design (CAD) tools and mathematical simulation software, are difficult and sometimes undesirable to use. For example, the cumbersome interfaces and techniques used to create 3D objects and the difficult to understand mathematics of simulation discourage designers from using these tools.

Computers with tablet-style interfaces have become common. A pencil-like stylus is used to draw on the surface of the computer's screen. Mostly, the stylus acts like a mouse from the computer's implementation. However, the user may hold the stylus as a drawing tool and perform more intricate motions than would be possible with a mouse or touchpad interface. Since the user draws strokes on the computer screen, the computer can record and calculate methods to interpret the strokes. This allows the strokes to be redrawn differently by the system as the 3D perspective is changed and to allow the strokes to form objects that can be animated.

Accordingly, there is a need for a tool that allows designers to sketch 3D objects quickly and put them in an environment where they behave like real objects. Such a tool can be used to aid in the design of new products and mechanisms, for example.

SUMMARY OF THE INVENTION

In an exemplary embodiment of the present invention, a system for creating physical simulations using hand-sketched three-dimensional (3D) objects comprises a memory device for storing a program; a processor in communication with the memory device, the processor operative with the program to enable: 3D objects to be hand-sketched and assigned physical descriptions, and behavior of the physical descriptions to be simulated in a physics environment.

The system further comprises an electronic sketching device on which the 3D objects are hand-sketched.

The electronic sketching device comprises a graphics tablet and a stylus.

The electronic sketching device comprises a display and a stylus.

The system further comprises a graphical user interface through which the physical descriptions are assigned.

The system further comprises a display on which the behavior of the physical descriptions is simulated.

The physics environment is a multi-body physics environment.

More than one 3D object is hand-sketched at a time.

The physical descriptions comprise body objects and constraints connected to the body objects.

A body object's physical movement is assigned to be moving or stationary.

A body object's physical properties are assignable.

The physical descriptions further comprise forces or torques acting on the body objects.

The physical descriptions further comprise behavior objects that create and delete objects from the simulation.

The processor is further operative with the program to operate in a drawing mode in which the 3D objects are hand-sketched and assigned physical descriptions, and a run mode in which the behavior of the physical descriptions is simulated.

The processor is further operative with the program to enable the 3D objects to be clicked and dragged prior to and during the simulation.

In an exemplary embodiment of the present invention, a method for creating a physical simulation using a hand-sketched 3D object comprises hand-sketching a 3D object, assigning a physical description to the 3D object, and activating the 3D object so that a behavior of its physical description is simulated in a physics environment.

The physics environment is a multi-body physics environment.

In an exemplary embodiment of the present invention, a computer program product is provided that comprises a computer readable medium having computer program logic recorded thereon for creating physical simulations using hand-sketched 3D objects, the computer program logic comprises program code that enables 3D objects to be hand-sketched and assigned physical descriptions, and behavior of the physical descriptions to be simulated in a physics environment.

The physics environment is a multi-body physics environment.

The foregoing features are of representative embodiments and are presented to assist in understanding the invention. It should be understood that they are not intended to be considered limitations on the invention as defined by the claims, or limitations on equivalents to the claims. Therefore, this summary of features should not be considered dispositive in determining equivalents. Additional features of the invention will become apparent in the following description, from the drawings and from the claims.

DETAILED DESCRIPTION OF EXEMPLARY EMBODIMENTS

Figure 1:
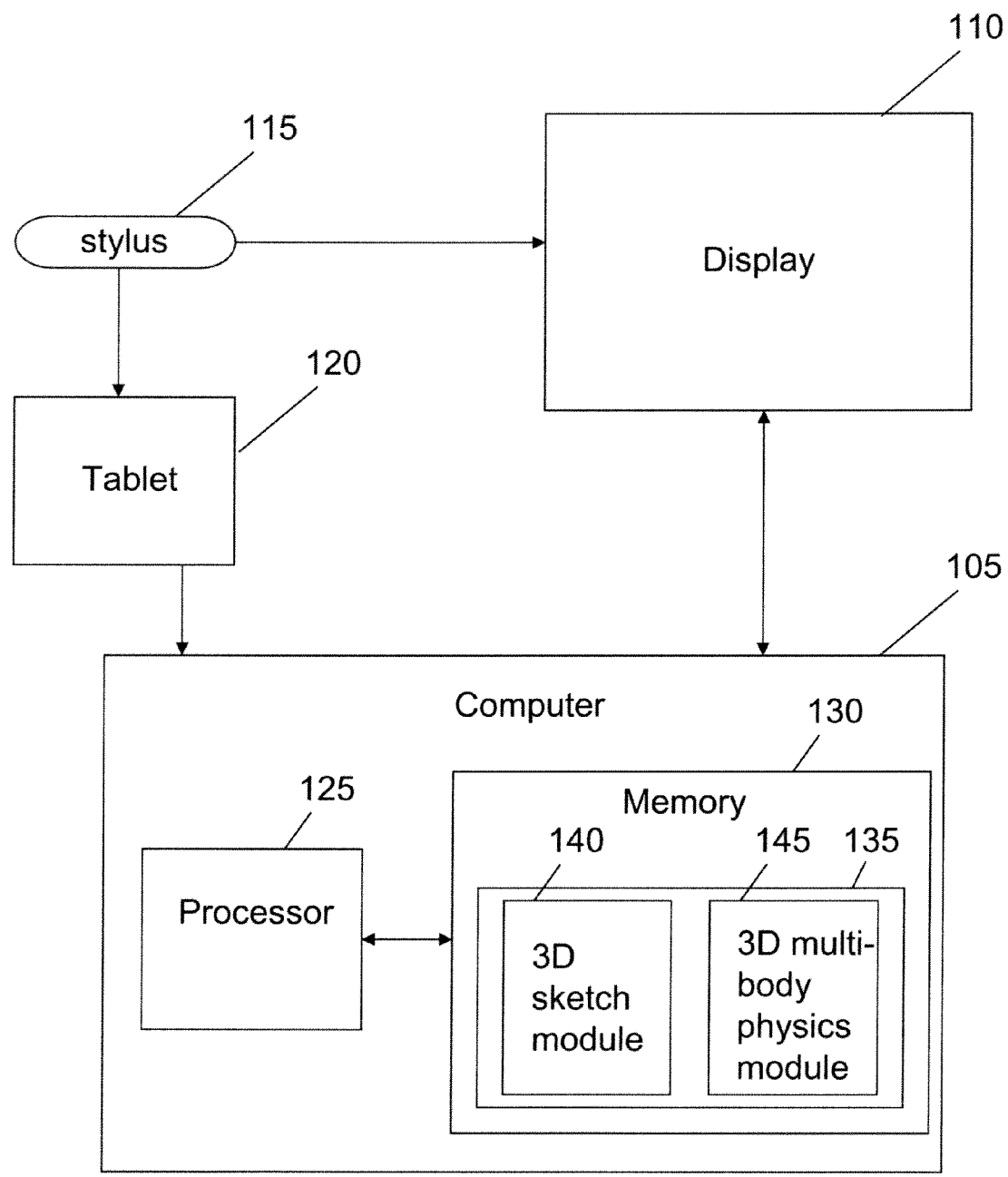
FIG. 1 is a block diagram of a system according to an exemplary embodiment of the present invention.

Exemplary embodiments of the present invention allow a user to create a physical simulation using hand-sketched three-dimensional (3D) objects. An exemplary embodiment of the present invention consists of a 3D sketching tool, such as the one described in U.S. Patent Application Pub. No. 2006/0082571, filed Apr. 20, 2005, the disclosure of which is incorporated by reference herein in its entirety, that is augmented with a physics engine capable of calculating multi-body physics, such as the one described in U.S. Patent Application Pub. No. 2008/0010041, filed Nov. 21, 2006, the disclosure of which is incorporated by reference herein in its entirety.

The 3D sketching tool is used to draw 3D objects on an electronic drawing device such as a tablet computer. In addition to the 3D geometry, the user indicates that some of the drawn objects are constrained or have forces acting upon them. The user switches the tool into a "Run" mode to let the physics take over and the objects move about and interact.

By using informal, hand-drawn sketching, objects and constraints between objects are created quickly. The imprecision of this method allows ideas to be tested and thrown-out or adjusted without a large time commitment. The advantage of doing this in 3D is that it enables more realistic interactions between the objects, since objects in 3D are complete from all sides and can move in any direction.

Prior art in the fields of 3D sketching and 3D multi-body simulation will now be discussed.

Currently, 3D sketching and 3D multi-body simulation exist, but independently. There are no commercial products for 3D sketching where the designer uses hand-drawn strokes to create a 3D model. There has been academic work in 3D sketching such as Igarashi's Teddy system, see [T. Igarashi, S. Matsuoka, H. Tanaka. "Teddy: A Sketching Interface for 3D Freeform Design". ACM SIGGRAPH, 1999. http://www-ui.is.s.u-tokyo.ac.jp/~takeo/teddy/teddy.htm], and applications by Lipson et al., see [M. Masry, D. Kang, I. Susilo, and H. Lipson. "Freehand Sketching Interface for Progressive Construction and Analysis of 3D Objects". American Association for Artificial Intelligence, 2004. http://ccsl.mae.cornell.edu/papers/AAAI04_Masry.pdf]. Although the technology from Teddy has been used in commercial games where its ease-of-use but limited drawing ability could be used by players to draw monsters, 3D sketching has not been available in professional tools for actual design or modeling.

In the computer-aided design (CAD) domain, the word "sketching" is often used differently from the vernacular. In CAD style sketching, the user creates objects with standard graphical interface techniques such as palettes and menus. An illustrative example is the SketchUp system, see [http://sketchup.google.com]. The difference between CAD sketching and regular CAD is that the application's user interface requires the user to specify fewer constraints and offers more flexible editing. Exemplary embodiments of the present invention are not concerned with CAD-style sketching, but rather refer to sketch in the more traditional sense of hand-drawn pictures.

3D sketching programs are becoming more sophisticated over time, though there are still limitations. Different sketching input styles have different limitations. Teddy, for example, cannot be used to draw models with straight lines or partial geometry (it allows for only curved, solid geometry like blobs). These sketching tools can only be used to draw a single connected model and cannot be used to draw multiple objects. They also cannot create arbitrary articulations or divisions in their models. In a physical system, having multiple interacting objects is essential.

There are many tools for simulating physics, but exemplary embodiments of the present invention are primarily concerned with multi-body physics (i.e., rigid body motion). A common library for implementing a multi-body physics application in 3D is the Open Dynamics Engine, see [Russell Smith. Open Dynamics Engine v0.5 User Guide. PDF document copyright 2001-2004. Russell Smith, February 2006]. In this kind of model, a number of objects exist in the model's world. These objects are modeled with mass, position, velocities, angular orientation, and other properties. Forces and constraints between the objects cause their states to evolve over time. The physics calculations or "engine" iteratively computes the state of the objects for each time step in determining how to apply the forces and constraints. To compute when objects touch, the physics engine uses a "collision detection" algorithm. The collision detection is normally run concurrently with the motion computation using the current positions of objects. When the system detects that the shapes of two objects overlap or will overlap, the appropriate constraints are added to the system to maintain the object's separation.

A two-dimensional (2D) version of sketching physics can be found in Microsoft's Physics Illustrator that was created from research performed at MIT, see [http://campus.mit.edu/MagicPaper/]. In the Physics Illustrator, the user can draw lines, circles, and other polygonal shapes. When put into run mode the application causes the objects to move downward as if under the pull of gravity. Shapes can be pinned to become stationary ramps or obstacles. The user may also add springs and rotational pivot points to make simple mechanisms.

There has been interest in combining 3D sketching with 3D physics simulation but only a few limited systems have actually been made. Lipson's 3D sketching tool has been augmented with a "sticks and springs" model to perform a kind of compression simulation. The lines of the model are treated as sticks and the connections between the lines are treated as torsion springs. By applying a "force" to a part of the model and fixing another part of the model, the model can be made to appear compressed. This feature cannot be generalized to other kinds of physical behavior such as collisions, constrained interaction between objects, or even most kinds of object motion.

Physics simulations of all kinds have been added to 3D CAD tools but these do not use sketching. Multi-body physics has also been added to the SketchUp tool but this is similar to adding physics to other CAD tools and is not related to hand-drawn sketching.

As can be seen, none of the prior systems has allowed a designer to simulate hand-drawn 3D models using a multi-body approach. The use of a multi-body physics engine in accordance with an exemplary embodiment of the present invention, will allow a significantly better interaction and a broader range of simulation than the sticks and springs model that has already been created. For example, a multi-body simulation with independent objects that move and collide in 3D allows a designer to create complex mechanisms and realistic machine behaviors.

Further, sketching is fast when compared to other methods of 3D modeling. For example, the designer does not need to build up a model with commands. Instead, the pen strokes on the computer screen are directly interpreted by the computer to form the model. In typical CAD, all model features are created in a laborious process of entering data into dialog boxes. To use CAD, the user must already know the model that is desired before starting. This defeats the purpose of designing in the first place.

Moreover, existing academic 3D sketching applications do not support multi-body physics because they do not allow the user to draw multiple objects. This limitation cannot be easily overcome using the interaction techniques those applications supply. Besides this major flaw, current academic systems limit the kinds of geometry the user can create. For example, Teddy can only create blobby solids. Other systems automatically create surfaces and solid parts without the user's consent and they cannot be easily removed.

As already mentioned exemplary embodiments of the present invention allow a designer to hand-sketch objects in 3D and then activate the objects so that they are able to interact in a multi-body physics environment. By using hand-sketched input, the system does not rely on precise measurements and positions. As a result, new scenarios and modifications to existing scenarios can be developed quickly. Using multi-body physics allows a wide variety of situations to be modeled like production machines, cars in traffic, construction processes, and other kinds of physical interaction, for example.

A system according to an exemplary embodiment of the present invention is illustrated in FIG. 1. As shown in FIG. 1, the system includes a computer 105, a display 110, a stylus 115 and a tablet 120. The stylus 115 is used to draw objects directly on the display 110 or on the tablet 120, which are then reproduced on the display 110. The computer 105 includes a processor 125 and a memory 130. The memory 130 includes a tool 135 that consists of a 3D sketch module 140 and a 3D multi-body physics module 145. The 3D sketch module 140 includes program code for executing the 3D sketching methods disclosed in U.S. Patent Application Pub. No. 2006/0082571 and 3D sketching methods in accordance with exemplary embodiments of the present invention. The 3D multi-body physics module 145 includes program code for executing the 3D physical simulation methods disclosed in U.S. Patent Application Pub. No. 2008/0010041 and 3D physical simulation methods in accordance with exemplary embodiments of the present invention. The processor 125 executes all the program code necessary to cause hand-sketched 3D objects to be shown and physically simulated on the display 110.

A method according to an exemplary embodiment of the present invention will now be discussed with reference to FIG. 2. For ease of understanding, this method covers a situation where a user hand-sketches a door and wants to see it fall downward. This method also covers a situation where the user wants to simulate opening and closing the door. It is to be understood that this is just for exemplary purposes and any number of objects and physical simulations can be implemented by this method. Moreover, this method is just one of many that can be implemented with the system in FIG. 1.

Figure 2:
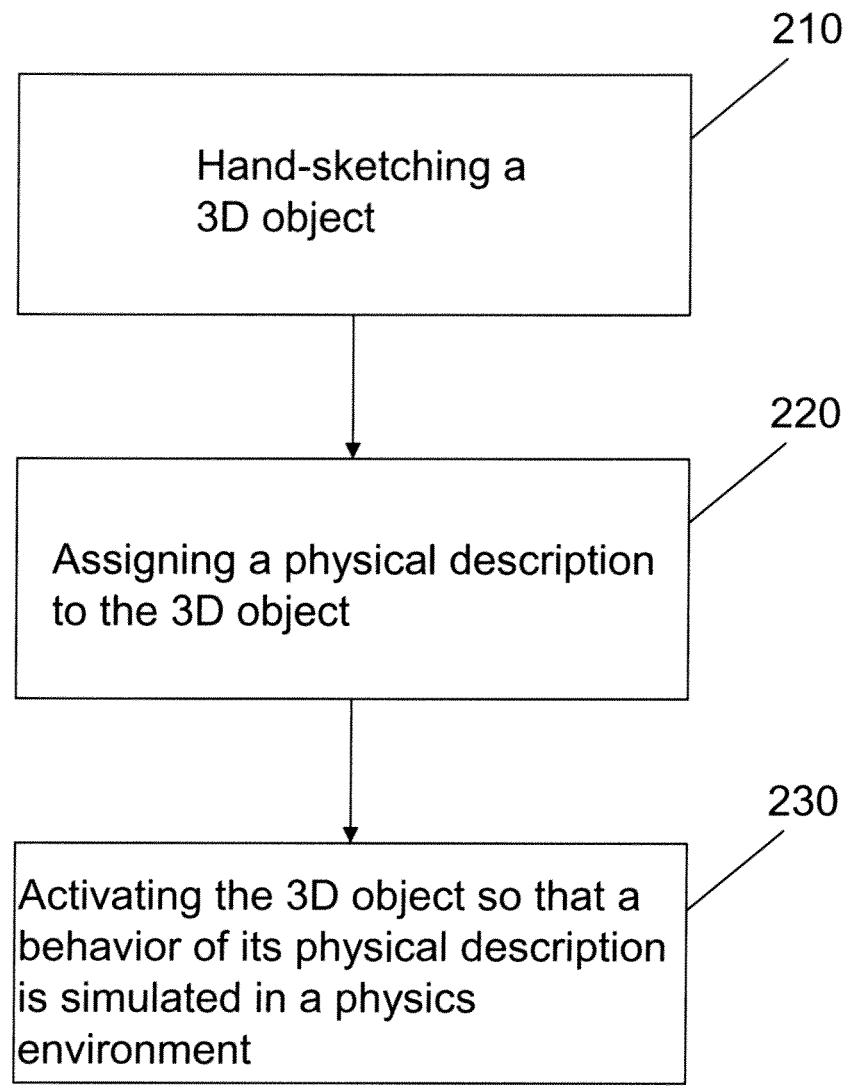
FIG. 2 is a flow diagram of a method according to an exemplary embodiment of the present invention.

As shown in FIG. 2, a user hand sketches a 3D object (i.e., the door) (210). This is done, for example, by using the stylus 115 and drawing the door on the display 110. The user assigns a physical description to the door (220). In the first situation, the door may be selected as movable body object, for example. In the second situation, the user may decide to apply a constraint to the door such as a hinge, for example. The details of how this constraint is applied will be described in detail hereinafter. The user also selects the door as a movable object in situation two. The user activates the physics engine by putting it into a run mode, which in situation ones causes the door to move downward as if under the pull of gravity for example, and in situation two, causes the door to open and close, for example (230).

Additional detail regarding the exemplary embodiments of the present invention will now be provided.

A 3D sketching system works by making assumptions about what the designer is drawing and how different kinds of shapes are drawn. Some systems use hand drawn strokes to directly represent model edges whereas others use strokes as gestures to represent transformative commands. For example, some strokes can be used as the contour of the model and others may be used to form ridges or ripples on a model's surface. An exemplary embodiment of the present invention uses a 3D sketching technology (embodied, for example, in the 3D sketch module 140) that allows the designer to draw more than one object at a time. To do this, the sketching application has the capability of interpreting strokes as being separate from any model that has already been started. The application is also able to interpret strokes interactively. Sketching systems that only infer from a single image are not well adapted to recognizing multiple objects because disparate objects tend to overlap from most viewing angles and it is generally more difficult to recognize strokes correctly when there are too many. Trying to draw multiple objects will tend to increase the number of strokes appreciably.

Sketched objects are assigned shapes that are used with the physics engine's collision detection system (the physics engine is embodied in the 3D multi-body physics module 145, for example). Generally, the shapes are based on the model as the user draws it. These are stored as a mesh that is a set of points and triangles that closely match the 3D shape of the model. Our system can perform collision detection using the meshes directly or it can simplify the shapes into more computationally simpler objects. For example, the number of triangles in the mesh can be reduced using mesh decimation. If the mesh happens to be convex, it can use a convex polyhedron collision detection solver. A mesh can also be decomposed into multiple shapes that can consist of any combination of primitive shapes (like spheres, cubes and capsules), convex polyhedra, and triangle meshes. The system can treat plain lines as a set of thin capsule objects or a triangle mesh with narrow triangles.

The shapes of the sketched objects are automatically assigned surface parameters. These parameters determine how objects behave when they collide. For example, the objects can have a low friction coefficient if they are supposed to be slippery and a high friction if they are supposed to stick together. The designer can access and modify the surface properties using menu or gesture commands.

The designer uses a drawing mode for creating and editing objects and switches to a running mode to have the objects interact physically. Some objects will move and have dynamic behavior whereas others will be stationary and acts as barriers. The designer designates a moving object by selecting a set of sketched models and grouping them together as a moving body. The body object represents physical movement and constraint connections. A body's properties include mass, inertia tensor, velocity, angular velocity, position, and orientation. The system automatically finds a center of mass and inertia tensor for the object by estimating the distribution of mass in its shape. The system default is to assume a uniform density. The designer can set the mass of the body as well as other parameters by accessing the body's property sheet.

A different interaction technique that can be used to determine which objects move is to assume that all models that are graphically connected act and move as a body. Our system automatically creates body objects for all the connected models using default parameters. The designer can then select objects that are meant to be stationary and "pin" those objects to the "background". A pinned object does not move and acts as a barrier to moving objects. Note that in 3D there really is no background as one would have in a 2D application. The designer would effectively be marking the object as immobile.

The designer can also designate multi-body constraints between body objects. These constraints include hinge joints, cylindrical joints, spherical joints, prismatic joints, etc. To create a joint constraint, the user sketches a line or point that is aligned to the orientation or position of the joint. The line or point will act as the constraint's visual image as well as its initial parameters. For example, the designer draws a line that is aligned to the axis of rotation to create a hinge joint. The designer designates the type of constraint by using a menu command or a gesture interface. Our system puts markers over the constraint's image for connecting the constraint to the bodies it affects. The designer drags the markers to the desired body objects that cause the body objects to become attached to the constraint.

Some objects can be added to the environment to create forces and torques. These are created the same way as constraints. For example, to create a rotary motor, the designer creates a line and then using a menu or gesture command converts the line into a rotary motor object. The rotary motor object is attached to the body objects using click-and-drag parameters. Other objects that impart forces are springs, and conveyor surfaces.

Another kind of simulation behavior adds or removes objects from the simulation. A deletion object will destroy a body object that intersects with it. This is used to remove objects from the simulation. To make a deletion object, the designer selects an object in the environment that has a shape (anything that acts as a body or a blocker) and uses a menu or gesture to convert it into a deletion object.

A creator object creates new objects and inserts them into the simulation at a designer-specified rate. To create a creator object, the designer picks one or more objects already in the system and uses a menu or a gesture command to designate it as a creator object. The first object the creator object creates is the one first drawn by the designer, after that the creator object continuously makes copies of the original object and inserts them into the simulation.

The designer can switch the system into run mode to see how the objects interact. The system's physics engine calculates the new positions of the bodies as they progress in time. Forces that act on the bodies can include gravity and other designer induced forces. For example, the designer can apply a spring force to an object by clicking and dragging on it with the mouse. Other forces are provided by the objects in the simulation. For example, a motor's torque causes a body object to run.

When the designer exits run mode, the system is reset to its state before run mode began. Objects that were created during simulation are removed and objects that were initially present but deleted are regenerated. Any object properties that were changed during run mode revert back to their original values.

As can be seen from the above-description, exemplary embodiments of the present invention enable 3D hand-drawn objects behave in a multi-body physics simulation. This is done, by including a means for drawing multiple 3D objects using a pen table like interface and then converting those objects into actors in the simulation.

Some new features provided by the present invention include: 1) a 3D sketching tool where one can draw multiple objects; 2) the ability to designate objects as moving or immobile; 3) specifying that lines or points behave as constraints between objects; 4) having a separate run mode that lets the physics simulation start; 5) be able to specify forces and gravitational effects between objects; 6) being able to click on and drag a sketched object in simulation; 7) being able to set the physical properties of the sketched object like mass and inertia; and 8) being able to insert behavior objects that create and delete objects from the simulation.

It is to be understood that although exemplary embodiments of the present invention have described with reference to multi-body physics simulations, the present invention is not limited thereto. For example, when computing power becomes sufficient, our system can be used to provide a cloth simulation for clothing that a designer draws. The 3D objects might also have other kinds of non-rigid behavior. For example, a hand-drawn blob might be squashed and stretched.

The present invention might be extended to other environments as well. For example, liquid behavior like floating, piping, flowing, and surface effects can be added to the simulation. You could sketch a boat with a cloth sail and have it sail against a virtual wind.

Moreover, the use of the present invention can extend beyond sketching mechanical devices. For example, one could use it to animate characters and backgrounds for movies and video games. Or, one could use it in a classroom to teach physics.

It is to be understood that the present invention may be implemented in various forms of hardware, software, firmware, special purpose processors, or a combination thereof. In one embodiment, the present invention may be implemented in software as an application program tangibly embodied on a program storage device (e.g., magnetic floppy disk, RAM, CD ROM, DVD, ROM, and flash memory). The application program may be uploaded to, and executed by, a machine comprising any suitable architecture.

It should also be understood that because some of the constituent system components and method steps depicted in the accompanying figures may be implemented in software, the actual connections between the system components (or the process steps) may differ depending on the manner in which the present invention is programmed. Given the teachings of the present invention provided herein, one of ordinary skill in the art will be able to contemplate these and similar implementations or configurations of the present invention.

It is to be further understood that the above description is only representative of illustrative embodiments. For convenience of the reader, the above description has focused on a representative sample of possible embodiments, a sample that is illustrative of the principles of the invention. The description has not attempted to exhaustively enumerate all possible variations. That alternative embodiments may not have been presented for a specific portion of the invention, or that further undescribed alternatives may be available for a portion, is not to be considered a disclaimer of those alternate embodiments. Other applications and embodiments can be implemented without departing from the spirit and scope of the present invention.

It is therefore intended, that the invention not be limited to the specifically described embodiments, because numerous permutations and combinations of the above and implementations involving non-inventive substitutions for the above can be created, but the invention is to be defined in accordance with the claims that follow. It can be appreciated that many of those undescribed embodiments are within the literal scope of the following claims, and that others are equivalent.

What is claimed is:

1. A system for creating physical simulations using hand-sketched three-dimensional (3D) objects, comprising:
    an electronic sketching device;
    a memory device for storing a program; and
    a processor in communication with the memory device, the processor operative with the program to enable:
        3D objects to be hand-sketched and assigned physical descriptions; and
        behavior of the physical descriptions to be simulated in a physics environment, wherein more than one 3D object is hand-sketched and simulated at a time and strokes of one of the hand-sketched 3D objects are interpreted as being separate from strokes of another of the hand-sketched 3D objects when they overlap as they are being made on the electronic sketching device by modeling the hand-sketched 3D objects different from each other as they are input, wherein a first 3D object is assigned surface parameters including at least one surface friction parameter as it is sketched and a second 3D object is assigned surface parameters including at least one surface friction parameter as it is sketched, and the surface friction parameters determine how the first and second 3D objects actively move after they collide with each other.

2. The system of claim 1, wherein the electronic sketching device comprises a graphics tablet and a stylus.

3. The system of claim 1, wherein the electronic sketching device comprises a display and a stylus.

4. The system of claim 1, further comprising:
a graphical user interface through which the physical descriptions are assigned.

5. The system of claim 1, further comprising:
a display on which the behavior of the physical descriptions is simulated.

6. The system of claim 1, wherein the physics environment is a multi-body physics environment.

7. The system of claim 1, wherein the physical descriptions comprise body objects and constraints connected to the body objects.

8. The system of claim 7, wherein a body object's physical movement is assigned to be moving or stationary.

9. The system of claim 7, wherein a body object's physical properties are assignable.

10. The system of claim 7, wherein the physical descriptions further comprise forces or torques acting on the body objects.

11. The system of claim 7, wherein the physical descriptions further comprise behavior objects that create and delete objects from the simulation.

12. The system of claim 1, wherein the processor is further operative with the program to:
operate in a drawing mode in which the 3D objects are hand-sketched and assigned physical descriptions, and a run mode in which the behavior of the physical descriptions is simulated.

13. The system of claim 1, wherein the processor is further operative with the program to:
enable the 3D objects to be clicked and dragged prior to and during the simulation.

14. A method for creating a physical simulation using hand-sketched three-dimensional (3D) objects, comprising:

hand-sketching first and second 3D objects on an electronic sketching device, wherein the first and second 3D objects are hand-sketched without restriction;

assigning a physical description to each of the 3D objects; and activating the 3D objects so that a behavior of each object's physical description is simulated at the same time in a physics environment, wherein surface parameters assigned to first and second 3D objects include at least one surface friction parameter for each of the first and second 3D objects as the first and second 3D objects are sketched on the electronic sketching device, and the surface friction parameters determine how the first and second 3D objects actively move when they collide, and wherein strokes of the first 3D object are interpreted as being separate from strokes of the second 3D object when they overlap as they are input by modeling the first and second 3D objects different from each other as they are input.

15. The method of claim 14, wherein the physics environment is a multi-body physics environment.

16. A computer program product comprising a non-transitory computer readable medium having computer program logic recorded thereon for creating physical simulations using hand-sketched three-dimensional (3D) objects, the computer program logic comprising:

program code that enables:
3D objects to be hand-sketched and assigned physical descriptions; and
behavior of the physical descriptions to be simulated in a physics environment, wherein more than one 3D object is hand-sketched and simulated at a time and strokes of one of the hand-sketched 3D objects are interpreted as being separate from strokes of another of the hand-sketched 3D objects when they overlap as they are being made on an electronic sketching device by modeling the hand-sketched 3D objects different from each other as they are input to the electronic sketching device, wherein a first 3D object is assigned surface parameters including at least one surface friction parameter in response to the first 3D object being sketched and a second 3D object is assigned surface parameters including at least one surface friction parameter in response to the second 3D object being sketched, and the surface friction parameters determine how the first and second 3D objects actively move in response to the first and second 3D objects colliding with each other.

17. The computer program product of claim 16, wherein the physics environment is a multi-body physics environment.

* * * * *